(12) United States Patent  
Ishizuka et al.

(10) Patent No.: US 10,818,214 B2  
(45) Date of Patent: Oct. 27, 2020

(54) DISPLAY SYSTEM FOR VEHICLE

(71) Applicant: Koito Manufacturing Co., Ltd., Tokyo (JP)

(72) Inventors: Takayoshi Ishizuka, Shizuoka (JP); Kazuhisa Inoue, Shizuoka (JP); Yosuke Ohashi, Shizuoka (JP); Tomoaki Harada, Shizuoka (JP); Yasuaki Tsutsumi, Shizuoka (JP); Yoshiro Ito, Shizuoka (JP); Yoshinori Shibata, Shizuoka (JP); Takeshi Iwasaki, Shizuoka (JP); Yasutaka Sasaki, Shizuoka (JP); Honami Fujii, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/391,630

(22) Filed: Apr. 23, 2019

(65) Prior Publication Data

US 2020/0312213 A1 Oct. 1, 2020

Related U.S. Application Data

(63) Continuation of application No. 15/423,929, filed on Feb. 3, 2017, now Pat. No. 10,311,770.

(51) Int. Cl.
*G09G 3/20* (2006.01)
*B60Q 1/52* (2006.01)
(Continued)

(52) U.S. Cl.
CPC ............ *G09G 3/2003* (2013.01); *B60Q 1/24* (2013.01); *B60Q 1/2607* (2013.01); *B60Q 1/50* (2013.01); *B60Q 1/503* (2013.01); *B60Q 1/52* (2013.01); *B60Q 5/008* (2013.01); *G09F 13/00* (2013.01); *G09G 3/20* (2013.01); *B60Q 1/2615* (2013.01); *B60Q 2300/45* (2013.01); *F21W 2102/40* (2018.01); *G09G 3/2092* (2013.01);
(Continued)

(58) Field of Classification Search
CPC combination set(s) only.
See application file for complete search history.

(56) References Cited

U.S. PATENT DOCUMENTS

| 2015/0194082 A1 | 7/2015 | McEwan |
| 2016/0041553 A1* | 2/2016 | Sato ............... B60W 30/143 701/23 |

(Continued)

FOREIGN PATENT DOCUMENTS

| JP | 2002-236993 A | 8/2002 |
| JP | 2014-149986 A | 8/2014 |

(Continued)

*Primary Examiner* — Wesner Sajous
(74) *Attorney, Agent, or Firm* — Abelman, Frayne & Schwab

(57) ABSTRACT

Provided is a display system for a vehicle. The display system includes a display device installed to be visually recognizable from the outside of a vehicle, and a control device configured to cause the display device to display state information of the vehicle. The control device receives a signal from a sensor that senses a distance from the vehicle to an object around the vehicle, and the control device changes display of the display device based on the distance.

10 Claims, 5 Drawing Sheets

(51) Int. Cl.
 *B60Q 5/00* (2006.01)
 *B60Q 1/26* (2006.01)
 *B60Q 1/50* (2006.01)
 *B60Q 1/24* (2006.01)
 *G09F 13/00* (2006.01)
 *F21W 102/40* (2018.01)

(52) U.S. Cl.
 CPC ............... *G09G 2320/0626* (2013.01); *G09G 2370/025* (2013.01); *G09G 2370/06* (2013.01); *G09G 2370/16* (2013.01); *G09G 2380/06* (2013.01); *G09G 2380/08* (2013.01); *G09G 2380/10* (2013.01)

(56) References Cited

U.S. PATENT DOCUMENTS

| | | | | |
|---|---|---|---|---|
| 2017/0066375 | A1* | 3/2017 | Kato | G06T 11/60 |
| 2018/0093619 | A1* | 4/2018 | Han | B60T 7/22 |
| 2018/0216958 | A1* | 8/2018 | Park | G01C 21/3608 |
| 2019/0270410 | A1* | 9/2019 | Baur | B60R 1/00 |
| 2019/0302761 | A1* | 10/2019 | Huang | G05D 1/0016 |

FOREIGN PATENT DOCUMENTS

| | | |
|---|---|---|
| KR | 10-2001-0070588 A | 7/2001 |
| KR | 20-0377648 B | 3/2005 |
| KR | 10-2015-0133534 A | 11/2015 |

\* cited by examiner

DISPLAY SYSTEM FOR VEHICLE

CROSS-REFERENCE TO RELATED APPLICATIONS

This application is a continuation of U.S. patent application Ser. No. 15/423,929, filed on Feb. 3, 2017, which claims priority from Japanese Application No. 2016-023563, filed on Feb. 10, 2016, the disclosures of which are incorporated herein by reference.

TECHNICAL FIELD

The present disclosure relates to a display system for a vehicle which represents state information of the vehicle.

BACKGROUND

Conventionally, as vehicle marker lamps, for example, turn signal lamps or tail and stop lamps have been installed on the front and rear sides of a vehicle. A pedestrian around the vehicle or the driver of another vehicle can be aware of the advancing direction or deceleration state of the vehicle by these marker lamps. See, for example, Japanese Patent Laid-Open Publication No. 2014-149986.

SUMMARY

Representing a larger amount of state information of a vehicle than the amount of information that is capable of being represented by a conventional marker lamp to a pedestrian around the vehicle or the driver of another vehicle is desirable in improving safety.

The present disclosure has been made in consideration of the aforementioned situation, and is to provide a display system for a vehicle (hereinafter, "vehicular display system"), which is capable of representing a larger amount of vehicle information to a pedestrian around the vehicle or the driver of another vehicle.

In order to achieve the above object, a vehicular display system according to any aspect of the present closure includes a display device installed to be visually recognizable from the outside of a vehicle, and a control device configured to cause the display device to display state information of the vehicle.

The control device may receive a signal from a sensor that senses a distance from the vehicle to an object around the vehicle, and the control device may change display of the display device based on the distance.

The display device may be disposed to illuminate a road surface around the vehicle.

The vehicle may be a vehicle that allows automatic driving or manual driving, and the control device may cause the display device to display information indicating whether the vehicle is in the process of automatic driving or manual driving.

With the present disclosure, a vehicular display system, which is capable of representing a larger amount of vehicle information to a pedestrian around the vehicle or the driver of another vehicle, may be provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
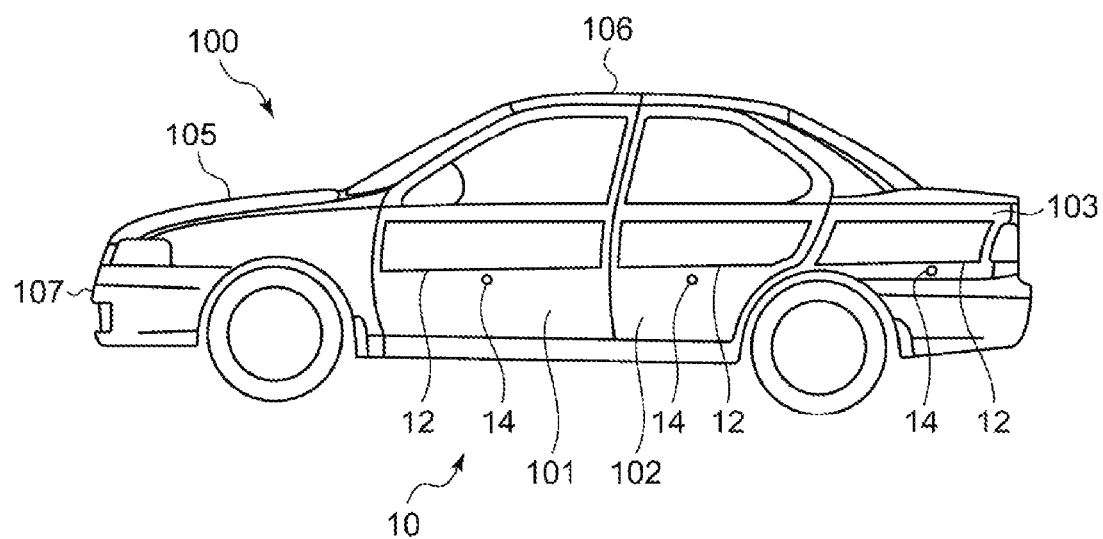
FIG. 1 is a side view illustrating a vehicle equipped with a vehicular display system according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented herein.

Hereinafter, a vehicular display system according to exemplary embodiments of the present disclosure will be described in detail with reference to the accompanying drawings. Meanwhile, each drawing is to describe a positional relationship of respective members, and therefore, needs not to illustrate an actual dimensional relationship of the respective members. In addition, in a description of each exemplary embodiment, the same or corresponding components will be designated by the same reference numerals, and a redundant description will be appropriately omitted.

Figure 2:
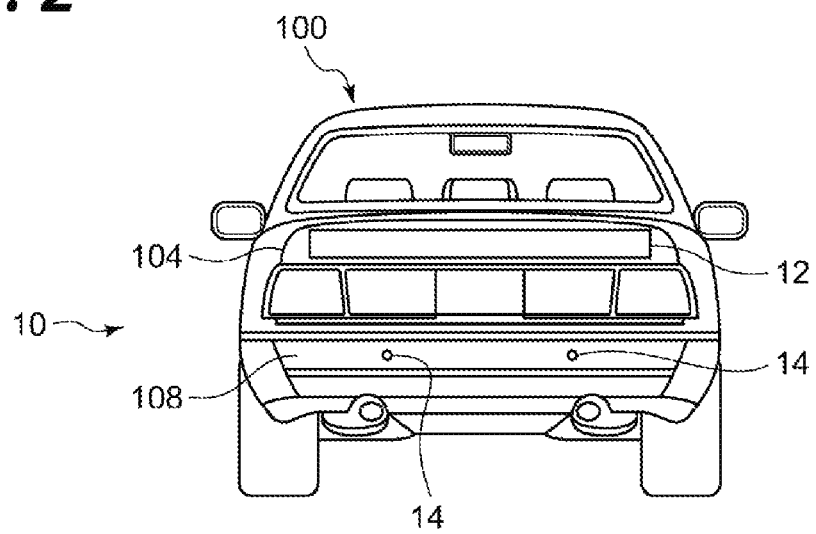
FIG. 2 is a rear view illustrating the vehicle equipped with the vehicular display system according to the exemplary embodiment of the present disclosure.
Figure 3:
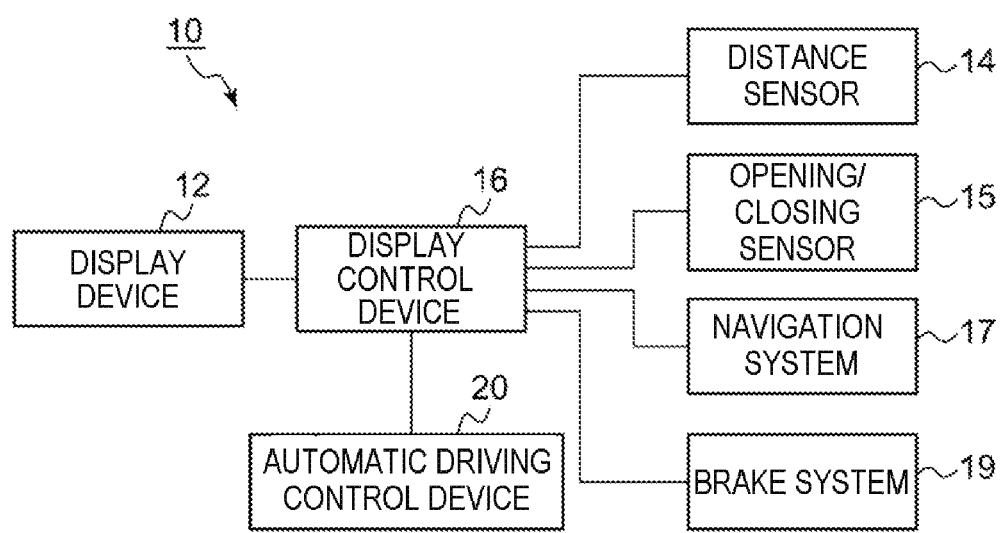
FIG. 3 is a functional block diagram for explaining the vehicular display system according to the exemplary embodiment of the present disclosure.

FIG. 1 is a side view illustrating a vehicle 100 equipped with a vehicular display system 10 according to an exemplary embodiment of the present disclosure. FIG. 2 is a rear view illustrating the vehicle 100 equipped with the vehicular display system 10 according to the exemplary embodiment of the present disclosure. FIG. 3 is a functional block diagram for explaining the vehicular display system 10 according to the exemplary embodiment of the present disclosure.

The vehicular display system 10 according to the present exemplary embodiment includes a display device 12 installed to be visually recognizable from the outside of the vehicle, and a display control device 16 (see, e.g., FIG. 3) that causes the display device 12 to display state information of the vehicle.

The display device 12 is not particularly limited as long as it is a thin display, and an organic EL display or a liquid crystal display may be properly used as the display device 12. As illustrated in FIG. 1, the display device 12 may be disposed on the exterior of the vehicle, i.e. a front door 101, a rear door 102, and a rear fender 103 on a lateral side of the vehicle 100. In addition, as illustrated in FIG. 2, the display device 12 may also be disposed on a trunk hood 104 on the rear side of the vehicle 100. However, the position at which the display device 12 is disposed is not limited to the above mentioned positions. The display device may be disposed on, for example, a bonnet 105, a roof 106, and a front bumper 107 of the vehicle 100. For example, in the case where the display device 12 is disposed on the roof 106 of the vehicle 100, the display device 12 may display an advertisement that is visible from the sky, for example, a skyscraper, an airplane or a helicopter. In addition, it is sufficient if the position at which the display device 12 is disposed is visually recognizable from the outside of the vehicle. For example, the display device 12 may be disposed inside the vehicle (e.g., inside a window glass). In addition, the shape of the display device 12 illustrated in FIGS. 1 and 2 is an example, and of course, the display device 12 is not limited to this shape.

Figure 4:
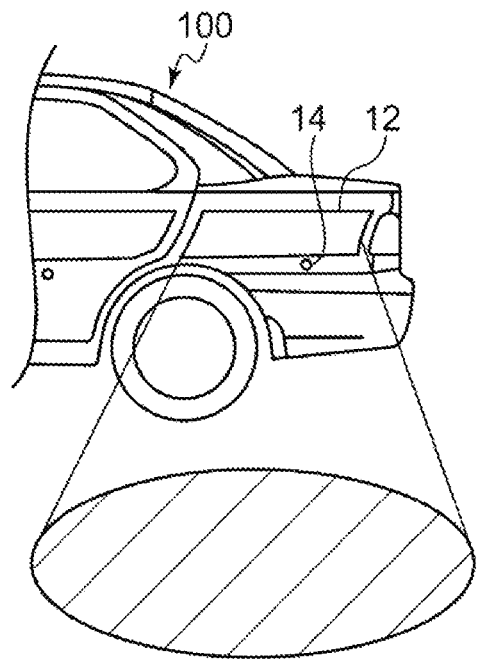
FIG. 4 is a view for explaining the light emitting state of a display device.

FIG. 4 is a view for explaining the light emitting state of the display device 12. In the present exemplary embodiment, the display device 12 is disposed to illuminate a road surface around the vehicle, as illustrated in FIG. 4. By illuminating the road surface around the vehicle, it is easier for, for example, a pedestrian who passes around the vehicle to check a road surface situation.

The display control device 16 controls the display contents of the display device 12. The display control device 16 is equipped inside the vehicle 100 (e.g., inside a dashboard).

A distance sensor 14 is connected to the display control device 16 to sense the distance from the vehicle 100 to an object around the vehicle. A sensing target object of the distance sensor 14 is, for example, a person or another vehicle. The kind of the distance sensor 14 is not particularly limited, and, for example, an ultrasonic sensor or an infrared sensor may be suitably used as the distance sensor 14. As illustrated in FIG. 1, the distance sensor 14 may be disposed on the front door 101, the rear door 102, and the rear fender 103 on a lateral side of the vehicle 100. In addition, as illustrated in FIG. 2, the distance sensor 14 may also be disposed on a rear bumper 108 on the rear side of the vehicle 100. However, the position at which the distance sensor 14 is disposed and the number of the distance sensors 14 are not particularly limited.

The display control device 16 receives a signal from the distance sensor 14, and calculates the distance from the vehicle 100 to an object around the vehicle based on the signal. The display control device 16 may change the display of the display device 12 based on the distance. For example, when a pedestrian approaches within a predetermined distance of the vehicle 100, the display control device 16 may increase the light emitting intensity of the display device 12 or change a luminescence color. Thus, the pedestrian may recognize that the vehicle is approaching. In addition, a speaker may be installed to the display control device 16 to allow the pedestrian to recognize that vehicle is approach via sound in addition to the light.

As illustrated in FIG. 3, an opening/closing sensor 15 may be connected to the display control device 16 to sense the opening/closing state of a door. The display control device 16 may receive a signal from the opening/closing sensor 15, and may change the display of the display device 12 based on the signal. For example, when a door is opened, the display control device 16 may cause the display device 12 to emit light so as to illuminate the passenger's feet.

Figure 5:
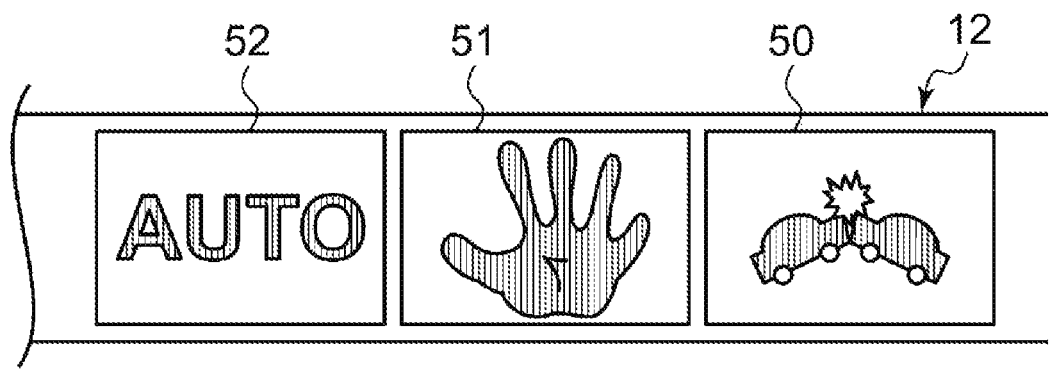
FIG. 5 is a view illustrating exemplary figures (icons) displayed on the display device.

The display device 12 may be configured not only to simply emit light, but also to display a figure or a character in order to represent state information of the vehicle to a pedestrian around the vehicle or the driver of another vehicle. FIG. 5 is a view illustrating exemplary figures (icons) displayed on the display device 12. The icon 50 indicates the occurrence of an accident in front of the vehicle to a pedestrian around the vehicle or the driver of another vehicle. As illustrated in FIG. 3, the display control device 16 may be connected to a navigation system 17 in order to acquire information regarding an accident in front of the vehicle. Representing the information may draw the attention of a pedestrian around the vehicle or the driver of another vehicle. In addition, because the driver of the following vehicle may acquire information without turning his/her eyes to a navigation system of his/her vehicle, safety may be increased.

The icon 51 illustrated in FIG. 5 indicates, to a pedestrian around the vehicle or the driver of another vehicle, that the vehicle decelerates or stops. As illustrated in FIG. 3, the display control device 16 may be connected to a brake system 19 of the vehicle in order to acquire deceleration or stop information. The deceleration information may also be represented by a stop lamp. However, when the deceleration information is also represented by the display control device 16 in addition to the stop lamp, the attention of a pedestrian around the vehicle or the driver of another vehicle may be increased. Likewise, the display control device 16 may cause the display device 12 to display information regarding, for example, a pedestrian in front of the vehicle or a fallen object, or information on traffic in the advancing direction.

When the vehicle 100 is a vehicle that allows automatic driving or manual driving, the icon 52 illustrated in FIG. 5 may be displayed. The icon 52 indicates whether the vehicle 100 is in the process of automatic driving or in the process of manual driving. That is, when the icon 52 is turned on, the icon 52 indicates that the vehicle 10 is in the process of automatic driving, and when the icon 52 is turned off, the vehicle 100 is in the process of manual driving. As illustrated in FIG. 3, the display control device 16 may be connected to an automatic driving control device 20 in order to acquire information as to whether the vehicle 100 is in the process of automatic driving or in the process of manual driving. Representing the icon 52 that indicates whether the vehicle is in the process of automatic driving or manual driving may draw the attention of a pedestrian or the driver of another vehicle.

As described above, with the vehicular display system 10 according to the present exemplary embodiment, a larger amount of vehicle information may be provided to a pedestrian around the vehicle or the driver of another vehicle.

Figure 6:
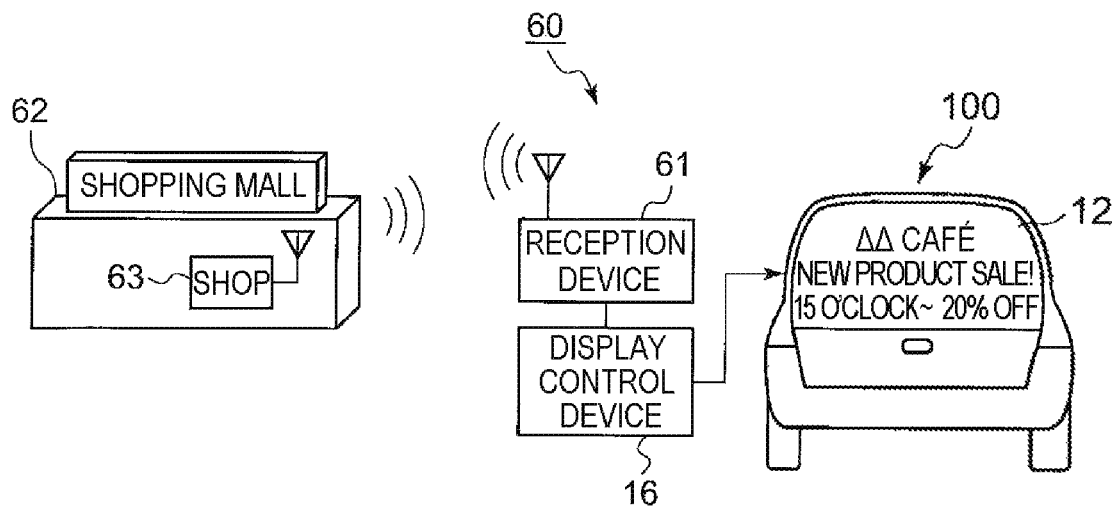
FIG. 6 is a view for explaining a vehicular display system according to a second exemplary embodiment of the present disclosure.

FIG. 6 is a view for explaining a vehicular display system 60 according to a second exemplary embodiment of the present disclosure. The vehicular display system 60 illustrated in FIG. 6 may display an advertisement of a shop 63 in, for example, a parking lot of a shopping mall 62 on a display device 12 of a vehicle 100.

The vehicular display system 60 includes a display device 12 installed to be visually recognizable from the outside of the vehicle 100, a reception device 62 that receives advertisement information wirelessly transmitted from the shop 63, and a display control device 16 that causes the display device 12 to display advertisement information received by the reception device 61.

A wireless communication method between the shop 63 and the reception device 61 is not particularly limited, and for example, wireless LAN may be adopted. As the reception device 61, an exclusive receiver may be used, or a receiver of, for example, a smartphone or a navigation system may be used in place of the reception device 61.

The display device 12 may be installed, for example, on a window of the vehicle 100, as illustrated in FIG. 6, or may be installed on a door of the vehicle 100, as illustrated in FIG. 1. When the display device 12 is installed on the window of the vehicle 100, the display device 12 may be a transmission type display.

With the vehicular display system 60, advertisement information may be effectively provided to a pedestrian within a parking lot. In particular, compared to a method for transmitting the advertisement information to a smartphone of the pedestrian, this system is advantageous in terms of high safety because the pedestrian does not need to look a smartphone while walking.

Figure 7:
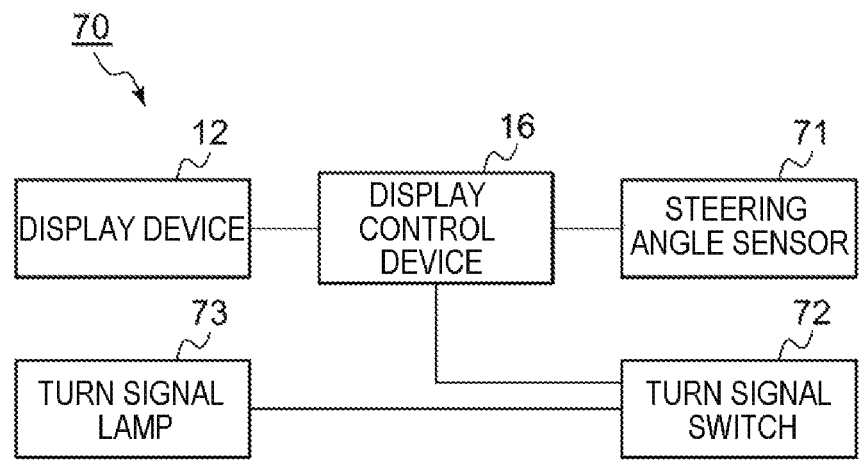
FIG. 7 is a functional block diagram for explaining a vehicular display system according to a third exemplary embodiment of the present disclosure.

FIG. 7 is a functional block diagram for explaining a vehicular display system 70 according to a third exemplary embodiment of the present disclosure. As illustrated in FIG. 7, in the vehicular display system 70, a steering angle sensor 71 is connected to a display control device 16 to sense the steering angle of a steering wheel (not illustrated). In addition, a turn signal switch 72 is connected to the display control device 16 to switch on/off of a turn signal lamp 73.

Figure 8:
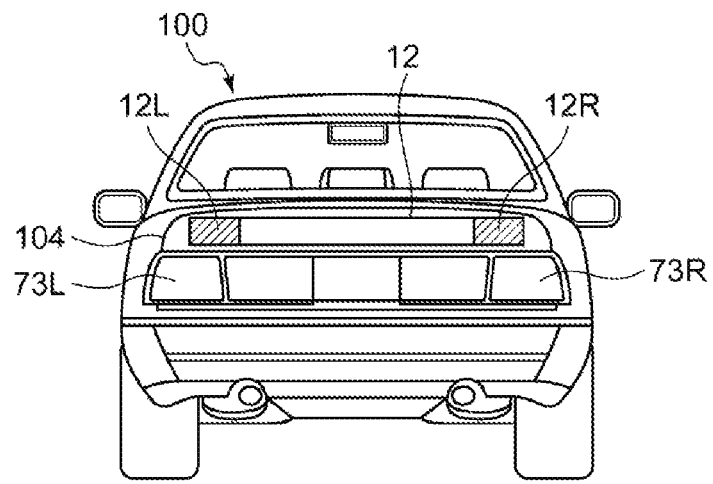
FIG. 8 is a view for explaining an operation of the vehicular display system according to the third exemplary embodiment.

FIG. 8 is a view for explaining an operation of the vehicular display system 70 according to the third exemplary embodiment. FIG. 8 illustrates the rear side of the vehicle 100. A display device 12 is disposed on the trunk hood 104 of the vehicle 100. In addition, turn signal lamps 73L and 73R are disposed on left and right sides below the display device 12.

In the vehicular display system 70, the display control device 16 changes the light emitting intensity of a left end area 12L and a right end area 12R of the display device 12 depending on the steering angle acquired from the steering angle sensor 71. For example, when the turn signal switch 72 is operated to switch on the left turn signal lamp 73L, the turn signal lamp 73L is turned on. At this time, when the steering wheel is manipulated so that steering angle information is input to the display control device 16 by the steering angle sensor 71, the display control device 16 turns on the left end area 12L of the display device 12. Here, the display control device 16 changes the light emitting intensity of the left end area 12L of the display device 12 based on the steering angle acquired from the steering angle sensor 71. For example, as the steering angle is increased, the light emitting intensity of the left end area 12L is increased. Thus, the direction in which the corresponding vehicle intends to turn may be represented to a pedestrian or the driver of another vehicle (e.g., a following vehicle). Thus, because, for example, the pedestrian may notice the advancing direction of the vehicle at an early time, safety may be improved.

Although the light emitting intensity of the left end area 12L and the right end area 12R of the display device 12 is changed based on the steering angle acquired from the steering angle sensor 71, in addition to or instead of varying the light emitting intensity, the light emitting area of the left end area 12L and the right end area 12R may be changed. For example, as the steering angle is increased, the light emitting area of the left end area 12L and the right end area 12R is increased. Even in this case, it is possible to suitably indicate, to a pedestrian or a following vehicle, the direction to which the corresponding vehicle intends to turn.

Figure 9:
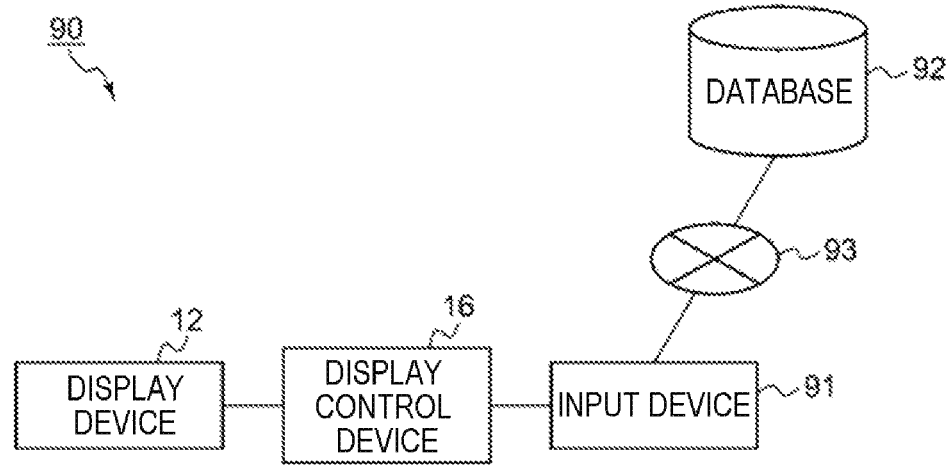
FIG. 9 is a functional block diagram for explaining a vehicular display system according to a fourth exemplary embodiment of the present disclosure.

FIG. 9 is a functional block diagram for explaining a vehicular display system 90 according to a fourth exemplary embodiment of the present disclosure. As illustrated in FIG. 9, in the vehicular display system 90, an input device 91 is connected to the display control device 16. The input device 91 downloads information regarding, for example, colors, light distribution patterns, and flickering patterns from a database 92 through the Internet 93, and transmits the downloaded information to a display control device 16. The display control device 16 controls, for example, the colors, light distribution patterns, and the flickering patterns of a display device 12 based on information input from the input device 91.

Figure 10:
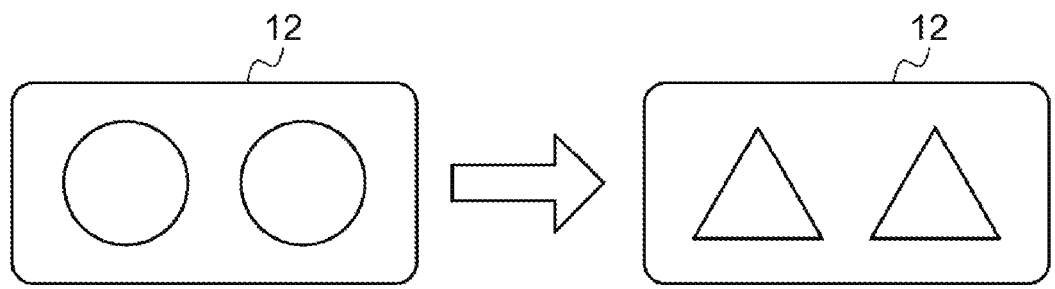
FIG. 10 is a view for explaining an operation of the vehicular display system according to the fourth exemplary embodiment.

FIG. 10 is a view for explaining an operation of the vehicular display system 90 according to the fourth exemplary embodiment. With the vehicular display system 90, the display device 12 may emit light in an arbitrary pattern through a change from a pattern (circle) illustrated at the left side of FIG. 10 to a pattern (triangle) illustrated at the right side.

Figure 11:
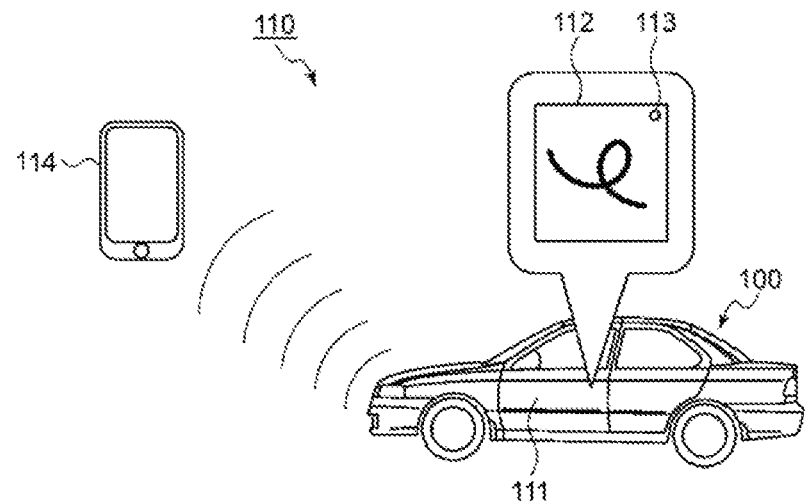
FIG. 11 is a view illustrating a keyless entry system using a touch panel.

FIG. 11 is a view illustrating a keyless entry system 110 using a touch panel. As illustrated in FIG. 11, a touch panel 112 may be disposed on a door 111 of the vehicle 100. In addition, a camera 113 may be disposed inside or near the touch panel 112.

In the keyless entry system 110, as illustrated in FIG. 11, when a preset figure is drawn on the touch panel 112, the door 111 may be unlocked. A camera 113 captures an image of the face of an operator of the touch panel 112 and sends the captured image to a control device (not illustrated). The control device records the image of the face of a user and the use frequency thereof. The control device issues a warning to a portable terminal 114 of an owner of the vehicle 100 when a person who does not exist in the image record unlocks the door of the vehicle 100. In addition, the control device may issue a warning to the portable terminal 114 of the owner of the vehicle 100 when the person who does not exist in the image record fails to unlock the door a predetermined number of times or more. At this time, the image of the operator's face captured by the camera 113 may be sent.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A display system for a vehicle, comprising:
   a display device installed to be visually recognizable from an outside of the vehicle;
   a reception device configured to receive advertisement information wirelessly transmitted from a shop;
   a sensor configured to measure a distance from the vehicle to objects around the vehicle including the shop; and
   a control device configured to cause the display device to display the advertisement information received by the reception device,
   wherein the control device receives a signal from the sensor and changes display on the display device based on the distance measured at the sensor.

2. A display system for a vehicle, comprising:
a display device installed to be visually recognizable from an outside of the vehicle;
a steering angle sensor configured to sense a steering angle of a steering wheel; and
a control device configured to cause the display device to display state information of the vehicle,
wherein the vehicle allows an automatic driving or a manual driving,
the control device causes the display device to display information indicating whether the vehicle is in the automatic driving or the manual driving, and
the control device changes a light emitting intensity of a left end area and a right end area of the display device according to the steering angle acquired from the steering angle sensor.

3. The display system according to claim 2, wherein, as the steering angle is increased, the light emitting intensity of the left end area and the right end area is increased.

4. The display system according to claim 2, wherein the light emitting area of the left end area and the right end area is changed according to the steering angle.

5. The display system according to claim 4, wherein, as the steering angle is increased, the light emitting area of the left end area and the right end area is increased.

6. The display system according to claim 4, further comprising a sensor configured to measure a distance from the vehicle to objects around the vehicle,
wherein the control device receives a signal from the sensor, and changes display on the display device according to the distance measured at the sensor.

7. A display system for a vehicle, comprising:
a touch panel disposed on a door of the vehicle, wherein the touch panel is disposed to be visually recognizable from an outside of the vehicle, and
wherein, when a preset figure is drawn on the touch panel, the door is unlocked.

8. The display system according to claim 7, further comprising:
a camera disposed inside or near the touch panel and configured to capture an image of a face of an operator of the touch panel; and
a control device configured to receive the image captured by the camera and store the image into an image record,
wherein the control device issues a warning to a portable terminal of an owner of the vehicle when an operator who does not exist in the image record attempts to unlock the door.

9. The display system according to claim 8, wherein the control device issues a warning to the portable terminal of the owner of the vehicle when the operator who does not exist in the image record fails to unlock the door a predetermined number of times or more.

10. The display system according to claim 8, wherein, when the warning is issued, the control device sends the image of the operator's face captured by the camera to the portable terminal.

* * * * *